United States Patent
Muramatsu (10) Patent No.: US 8,325,977 B2
(45) Date of Patent: Dec. 4, 2012

(54) IMAGE RECOGNITION AND FOCUS ADJUSTMENT USING WEIGHTED IMAGE DIFFERENCE INFORMATION

(75) Inventor: Keiko Muramatsu, Tokyo (JP)

(73) Assignee: Nikon Corporation, Tokyo (JP)

( * ) Notice: Subject to any disclaimer, the term of this patent is extended or adjusted under 35 U.S.C. 154(b) by 1174 days.

(21) Appl. No.: 12/141,480

(22) Filed: Jun. 18, 2008

(65) Prior Publication Data

US 2009/0010492 A1 Jan. 8, 2009

(30) Foreign Application Priority Data

Jul. 3, 2007 (JP) .................................. 2007-175021

(51) Int. Cl.
- *G06K 9/00* (2006.01)
- *G06K 9/62* (2006.01)
- *H04N 5/225* (2006.01)

(52) U.S. Cl. .................... 382/103; 382/209; 348/208.14; 348/349; 348/169

(58) Field of Classification Search .......................... None
See application file for complete search history.

(56) References Cited

U.S. PATENT DOCUMENTS

| | | | | |
|---|---|---|---|---|
| 5,481,622 A | * | 1/1996 | Gerhardt et al. | 382/103 |
| 5,512,974 A | * | 4/1996 | Abe et al. | 396/153 |
| 5,808,695 A | * | 9/1998 | Rosser et al. | 348/584 |
| 6,031,568 A | * | 2/2000 | Wakitani | 348/169 |
| 6,944,331 B2 | * | 9/2005 | Schmidt et al. | 382/165 |
| 2004/0004670 A1 | * | 1/2004 | Yamashita | 348/345 |
| 2005/0264679 A1 | | 12/2005 | Sasaki et al. | |
| 2006/0023914 A1 | * | 2/2006 | Gold, Jr. | 382/103 |
| 2006/0210260 A1 | * | 9/2006 | Yata | 396/147 |

FOREIGN PATENT DOCUMENTS

| | | |
|---|---|---|
| JP | 2006-58431 | 3/2006 |
| JP | 2006-201682 | 8/2006 |

OTHER PUBLICATIONS

Japanese Office Action for corresponding JP Application No. 2007-175021, Oct. 11, 2011.

* cited by examiner

*Primary Examiner* — Barry Drennan
(74) *Attorney, Agent, or Firm* — Ditthavong Mori & Steiner, P.C.

(57) ABSTRACT

An image recognition device includes a detection unit which is configured to detect a first difference between partial information of at least a part of the first image information and the reference information and to detect a second difference between partial information of at least a part of the second image information and the reference information. A recognition unit is configured to recognize a first area corresponding to the reference image in the first image information. A calculation unit is configured to calculate a determination value based on a reference area in the second image information corresponding to the first area by weighting the second difference. The recognition unit is configured to recognize a second area corresponding to the reference image in the second image information based on at least one of the second difference and the determination value.

34 Claims, 10 Drawing Sheets

IMAGE RECOGNITION AND FOCUS ADJUSTMENT USING WEIGHTED IMAGE DIFFERENCE INFORMATION

CROSS-REFERENCE TO RELATED APPLICATIONS

The present application claims priority under 35 U.S.C. §19 to Japanese Patent Application No. 2007-175021, filed Jul. 3, 2007. The contents of this application are incorporated herein by reference in their entirety.

BACKGROUND OF THE INVENTION

1. Field of the Invention

The present invention relates to an image recognition device, a focus adjustment device, an imaging apparatus, an image recognition method, and a focus adjustment method.

2. Discussion of the Background

There is known an image tracking device for storing an image of a target to be focused as a reference image (template image), detecting an image that matches the reference image from repeatedly photographed images through template matching process, and tracking the target (see, for example, Japanese Laid-Open Patent Publication No. 2006-058431).

When the background of the target to be focused is similar in color information with the target, however, there is a possibility other portions such as the background different from the target might be falsely recognized.

SUMMARY OF THE INVENTION

According to one aspect of the present invention, an image recognition device includes an imaging unit, a holding unit, a detection unit, a recognition unit, and a calculation unit. The imaging unit is configured to acquire first image information and second image information. The holding unit is configured to hold reference information that functions as a reference image. The detection unit is connected to the holding unit and is configured to detect a first difference between partial information of at least a part of the first image information and the reference information and to detect a second difference between partial information of at least a part of the second image information and the reference information. The recognition unit is connected to the holding unit and is configured to recognize a first area corresponding to the reference image in the first image information. The calculation unit is connected to the detection unit and is configured to calculate a determination value based on a reference area in the second image information corresponding to the first area by weighting the second difference. The recognition unit is configured to recognize a second area corresponding to the reference image in the second image information based on at least one of the second difference and the determination value.

According to another aspect of the present invention, a focus adjustment device in the image recognition device in which the imaging unit is configured to acquire the first image information and the second image information through an optical system includes a focus detection unit, a selection unit, and a focus adjustment unit. The focus detection unit is configured to detect a focus state of the optical system at a plurality of detection areas provided in a screen by the optical system. The selection unit is connected to the focus detection unit and configured to select at least one detection area from the plurality of detection areas based on a position of a partial region recognized by the recognition unit and the focus state detected by the focus detection unit. The focus adjustment unit is configured to perform focus adjustment of the optical system based on the focus state detected by the focus detection unit with respect to the at least one detection area selected by the selection unit.

According to yet another aspect of the present invention, an imaging apparatus includes the focus adjustment device.

According to the other aspect of the present invention, an image recognition method includes acquiring first image information and second image information, holding reference information that functions as a reference image, detecting a first difference between partial information of at least a part of the first image information and the reference information, recognizing a first area corresponding to the reference image in the first image information, detecting a second difference between partial information of at least a part of the second image information and the reference information, weighting the second difference based on a reference area in the second image information corresponding to the first area to calculate a determination value, and recognizing a second area corresponding to the reference image in the second image information based on at least one of the second difference or the determination value.

According to further aspect of the present invention, an image recognition method includes acquiring first image information and second image information, holding reference information that functions as a reference image, detecting a first difference between partial information of at least a part of the first image information and the reference information, recognizing a first area corresponding to the reference image in the first image information, detecting a second difference between partial information of at least a part of the second image information and the reference information, weighting the second difference based on a reference area in the second image information corresponding to the first area to calculate a determination value, and recognizing a second area corresponding to the reference image in the second image information based on at least one of the second difference or the determination value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

One embodiment of an imaging apparatus (single-lens reflex digital still camera) having an automatic focus adjustment (AF) function of detecting a focus adjustment state (defocus amount in the embodiment) of a photographing lens at a plurality of focus detection areas set within a photographing screen and focus driving the photographing lens based on the defocus amount of one of the areas, and an image tracking function of storing an image of a subject to be tracked in the photographing images as a template image (reference image) and tracking the subject to be tracked while searching for a position of the image same as or similar to the template image of the repeatedly photographed images (template matching), and being equipped with an image recognition device for tracking the target while driving the photographing lens with the AF function and the image tracking function will be described.

Figure 1:
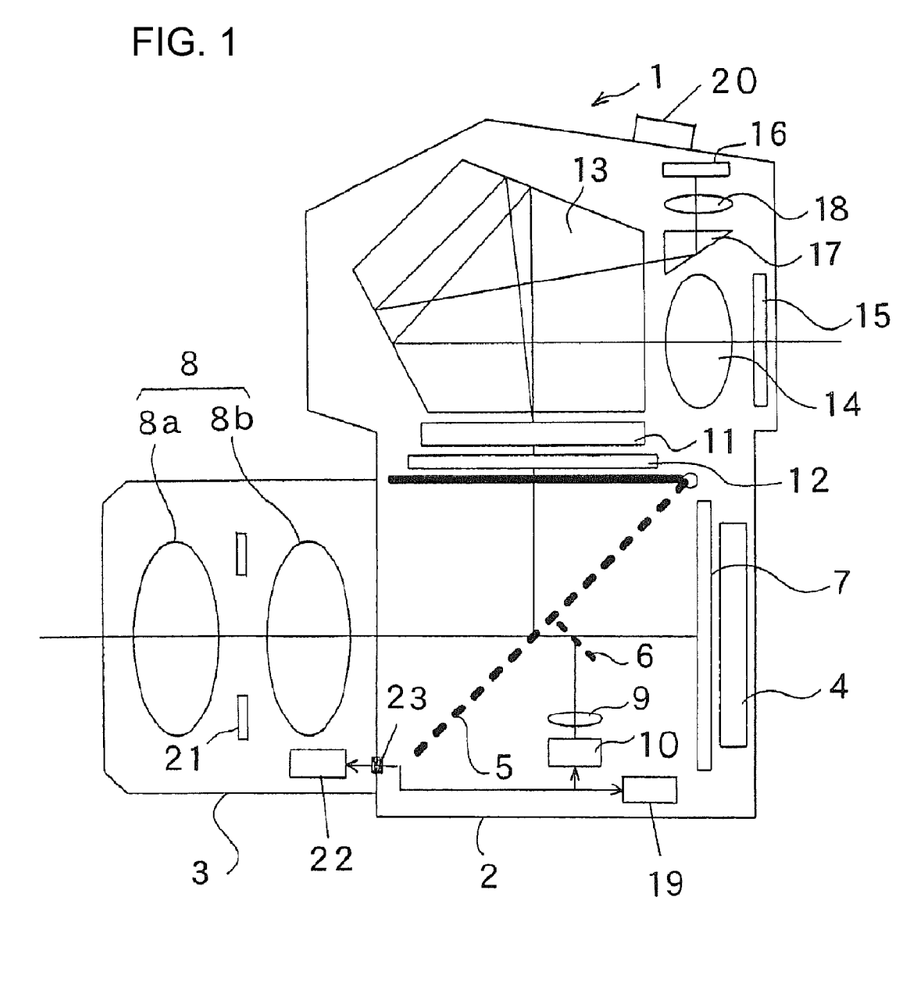
FIG. 1 is a view showing a configuration of an imaging apparatus equipped with an image recognition device according to one embodiment of the present invention.

FIG. 1 shows a configuration of the imaging apparatus (single-lens reflex digital still camera) 1 equipped with the image recognition device according to one embodiment. In FIG. 1, illustration and description are not provided on equipment and circuits of the camera not directly related to the embodiment of the present invention. The camera 1 according to one embodiment has an interchangeable lens 3 attached to a camera body 2 in an interchangeable manner. A first imaging element 4 for imaging a subject image and recording the image is arranged in the camera body 2. The first imaging element 4 is configured by CCD, CMOS, and the like. In time of photographing, a quick return mirror 5 and a sub-mirror 6 evacuate to a position outside a photographing optical path shown with a solid line, and a shutter 7 is opened, so that the subject image is imaged on a light receiving surface of the first imaging element 4 by a photographing lens 8.

A focus detection optical system 9 and a distance measuring element 10 for detecting the focus adjustment state of the photographing lens 8 are arranged at the bottom of the camera body 2. In this embodiment, an example of adopting a focus detection method by an eye division phase difference detection system is shown. The focus detection optical system 9 guides a pair of focus detection light fluxes passed through the photographing lens 8 to a light receiving surface of the distance measuring element 10, and images a pair of optical images. The distance measuring element 10 includes a pair of CCD line sensors, and the like, and outputs a focus detection signal corresponding to the pair of optical images. The quick return mirror 5 and the sub-mirror 6 are set at a position in the photographing optical path as shown with a broken line before photographing, where the pair of focus detection light fluxes from the photographing lens 8 are transmitted through a half mirror part of the quick return mirror 5, reflected by the sub-mirror 6, and guided to the focus detection optical system 9 and the distance measuring element 10.

A finder optical system is arranged at the upper part of the camera body 2. The quick return mirror 5 and the sub-mirror 6 are at a position shown with a broken line before photographing, where the subject light from the photographing lens 8 is reflected by the quick return mirror 5 and guided to a focusing plate 11 so that the subject image is imaged on the focusing plate 11. A liquid crystal display element 12 displays information such as focus detection area mark in a superimposed manner on the subject image imaged on the focusing plate 11, and also displays various photographing information such as exposure value at a position outside the subject image. The subject image on the focusing plate 11 is guided to an eyepiece window 15 through a pentagonal roof prism 13 and an eyepiece lens 14, so that the photographer can visually recognize the subject image.

A second imaging element 16 for imaging the subject image for subject tracking or photometry is arranged in the finder optical system at the upper part of the camera body 2. The subject image imaged on the focusing plate 11 is re-imaged on a light receiving surface of the second imaging element 16 through the pentagonal roof prism 13, a prism 17, and an imaging lens 18. The second imaging element 16 outputs an image signal corresponding to the subject image. The subject image imaged on the focusing plate 11 before photographing is guided to the second imaging element 16 through the pentagonal roof prism 13, the prism 17, and the imaging lens 18, and the subject image is re-imaged on the light receiving surface of the second imaging element 16. The details will be described later, where the tracking control and the exposure calculation are performed based on the subject image imaged by the second imaging element 16.

A body drive control device 19, an operation member 20, and the like are arranged in the camera body 2. The body drive control device 19 is configured by a microcomputer, peripheral components such as memory and A/D converter, and the like to be described later in detail, and performs various controls and calculations of the camera 1. The operation member 20 includes switches and selectors for operating the camera 1 such as shutter button, focus detection area selection switch, photographing mode selection switch, and the like.

A zooming lens 8a, a focusing lens 8b, an aperture 21, a lens drive control device 22, and the like are arranged in the interchangeable lens 3. In the embodiment, the photographing lens 8 is representatively indicated with the zooming lens 8a, the focusing lens 8b, and the aperture 21, but the configuration of the photographing lens 8 is not limited to the configuration shown in FIG. 1. The lens drive control device 22 is configured by a microcomputer, peripheral components such as memory, drive circuit, and actuator, and the like (not shown), and performs drive control of the lenses 8a, 8b and the aperture 21 and the setting position detection thereof. Information such as focal length and opening aperture value of the interchangeable lens 3 are stored in the memory built in the lens drive control device 22.

The body drive control device 19 and the lens drive control device 22 communicate through a contact point 23 of a lens mount unit, where information such as lens driving amount and aperture value are transmitted from the body drive control device 19 to the lens drive control device 22, and lens information and aperture information are transmitted from the lens drive control device 22 to the body drive control device 19.

Figure 2:
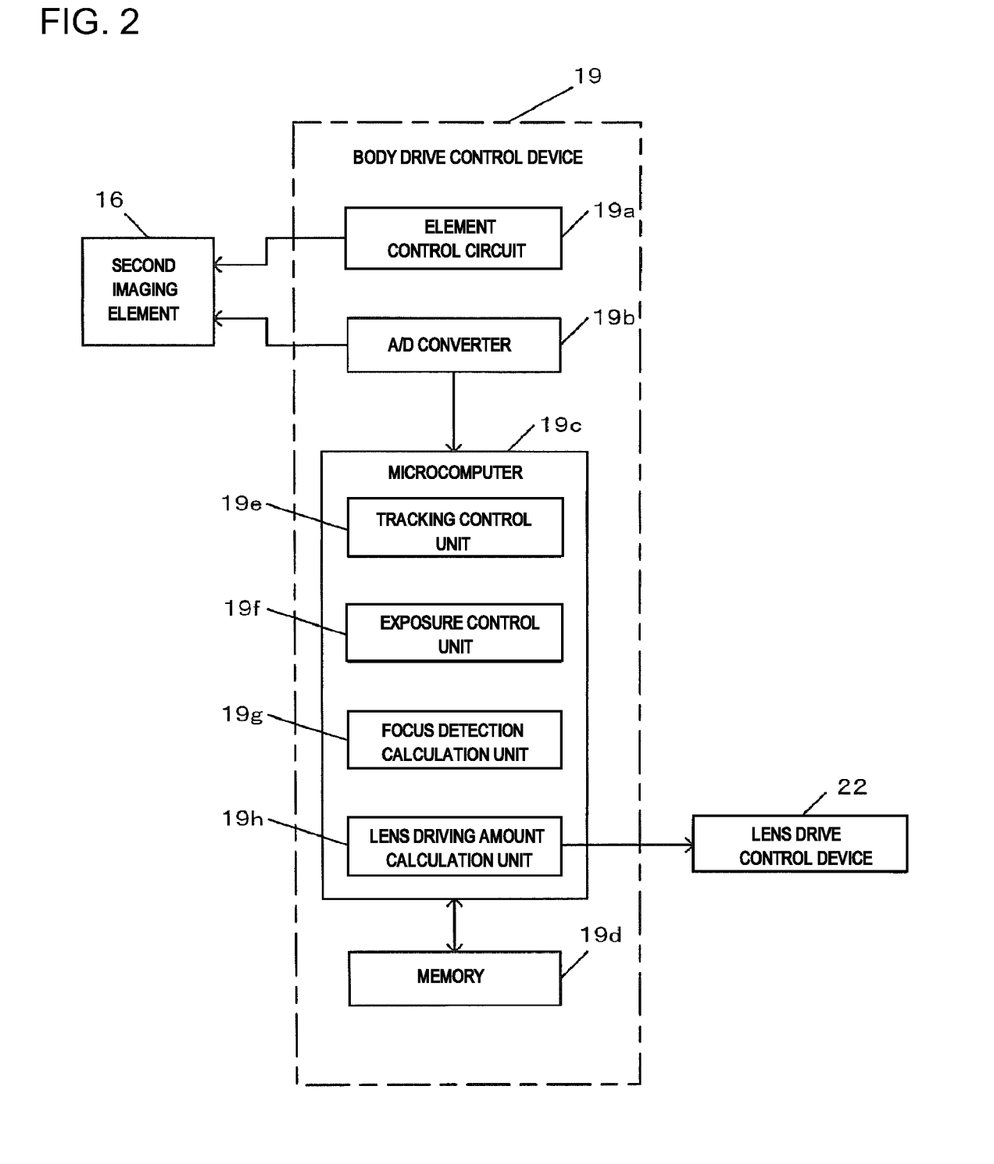
FIG. 2 is a view showing a detailed configuration of a body drive control device.

FIG. 2 shows a detailed configuration of the body drive control device 19. Illustration and description are not provided on the control functions not directly related to the embodiment of the present invention. The body drive control device 19 includes an element control circuit 19a, an A/D converter 19b, a microcomputer 19c, a memory 19d, and the like. The element control circuit 19a controls accumulation and readout of charges of the second imaging element 16. The A/D converter 19b converts an analog image signal output from the second imaging element 16 to a digital image signal. The microcomputer 19c configures, in software form, a tracking control unit 19e, an exposure control unit 19f, a focus detection calculation unit 19g, and a lens driving amount calculation unit 19*h*. The memory 19*d* stores information such as template image for image tracking and defocus amount, or lens information such as focal length, opening F value, aperture value, and conversion coefficient from image shift amount to defocus amount of the photographing lens 8.

The tracking control unit 19*e* stores the image corresponding to the tracking target position manually specified by the photographer or the tracking target position automatically set by the camera 1 of the subject image imaged by the second imaging element 16 as a template image (reference image) in the memory 19*d*, and searches the image region that matches or is similar to the template image from the subsequently and repeatedly photographed images to recognize the position of the target. The exposure calculation unit 19*f* calculates an exposure value based on the image signal imaged by the second imaging element 16.

The focus detection calculation unit 19*g* detects the focus adjustment state, or defocus amount herein, of the photographing lens 8 based on the focus detection signal corresponding to the pair of optical images output from the distance measuring element 10. The details will be described later, but a plurality of focus detection areas is set within the photographing screen of the photographing lens 8, the distance measuring element 10 outputs the focus detection signal corresponding to the pair of optical images for every focus detection area, and the focus detection calculation unit 19*g* detects the defocus amount based on the focus detection signal corresponding to the pair of optical images for every focus detection area. The lens driving amount calculation unit 19*h* converts the detected defocus amount to the lens driving amount.

Figure 3:
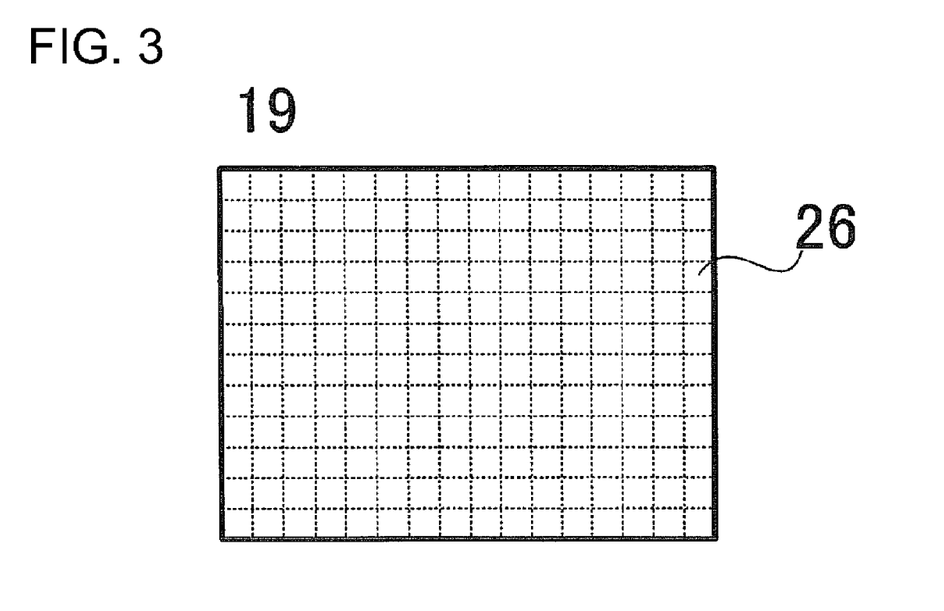
FIG. 3 is a front view showing a detailed configuration of a second imaging element.
Figure 4:
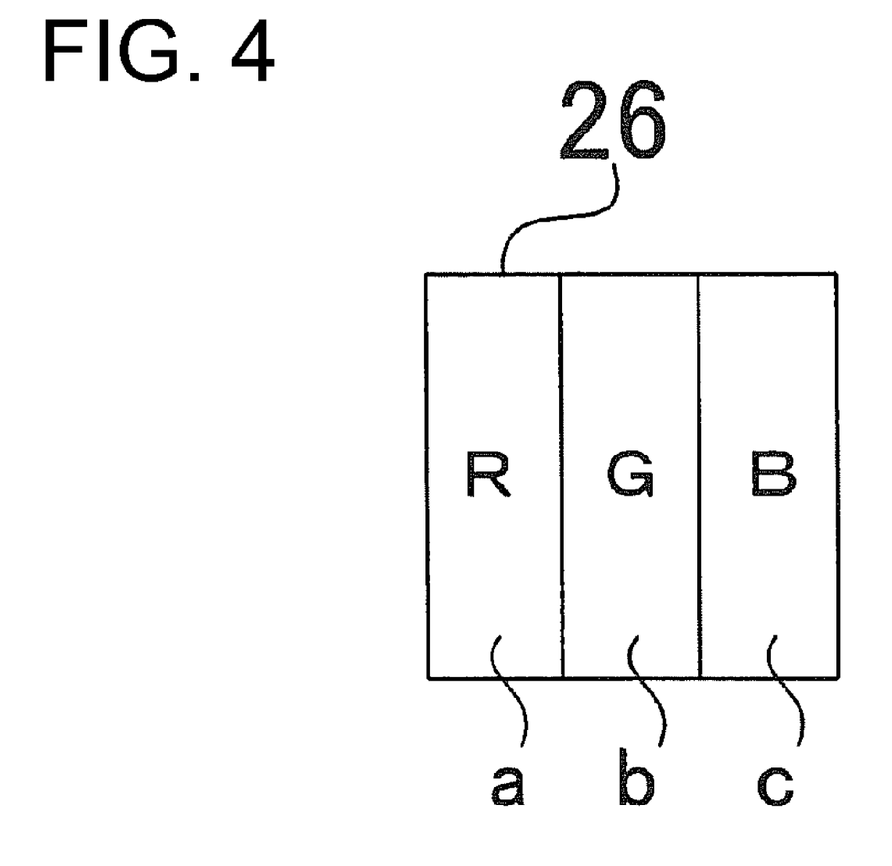
FIG. 4 is a detailed view of a pixel of the second imaging element.

FIG. 3 is a front view showing a detailed configuration of the second imaging element 16. The second imaging element 16 includes a plurality of (26 herein, 16×12=192) pixels (photoelectric conversion elements) arrayed in a matrix form. As shown in FIG. 4, each pixel 26 is divided into three portions 26*a*, 26*b*, and 26*c*, and a primary color filter of red R, green G, and blue B is arranged in the respective portions 26*a*, 26*b*, and 26*c*. Thus, the RGB signal of the subject image can be output for every pixel 26.

Figure 5:
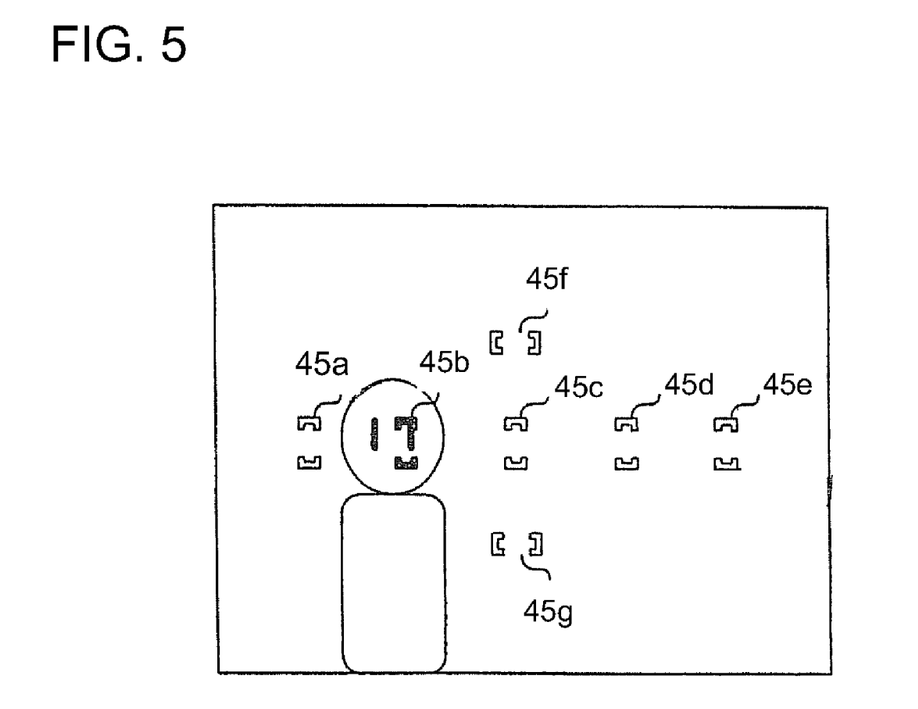
FIG. 5 is a view showing an arrangement of a focus detection area in a photographing screen.
Figure 6A:
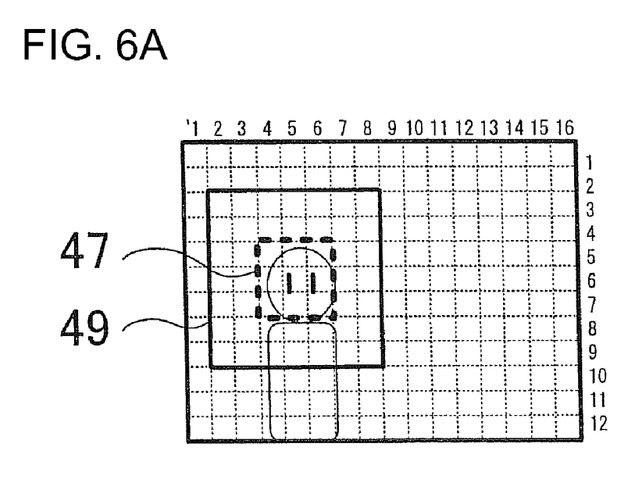
FIG. 6 is a view describing a subject tracking method according to one embodiment of the present invention.
Figure 6B:
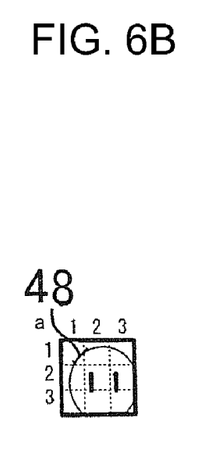
Figure 7A:
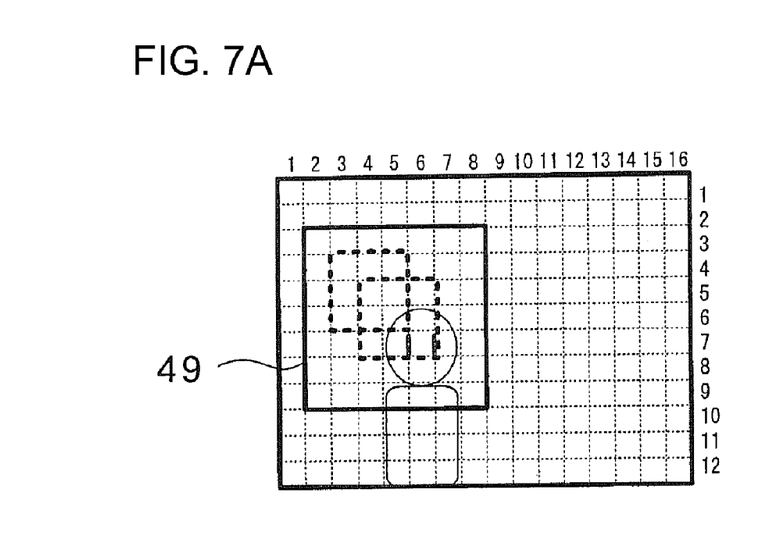
FIG. 7 is a view describing the subject tracking method according to one embodiment of the present invention.
Figure 7B:
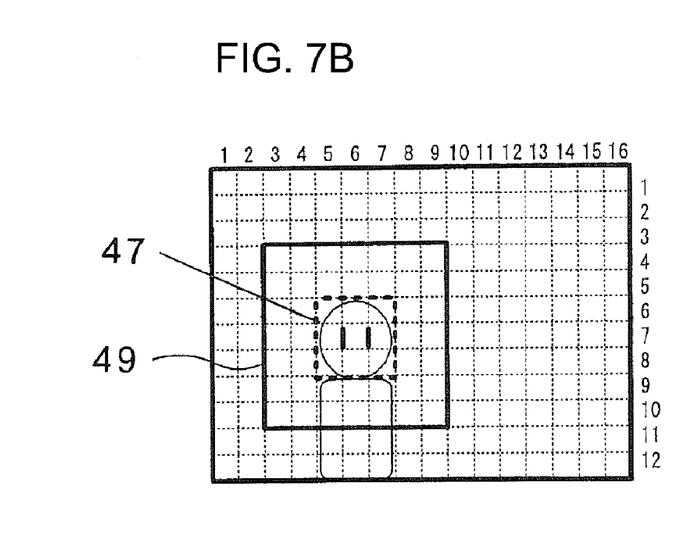
Figure 8:
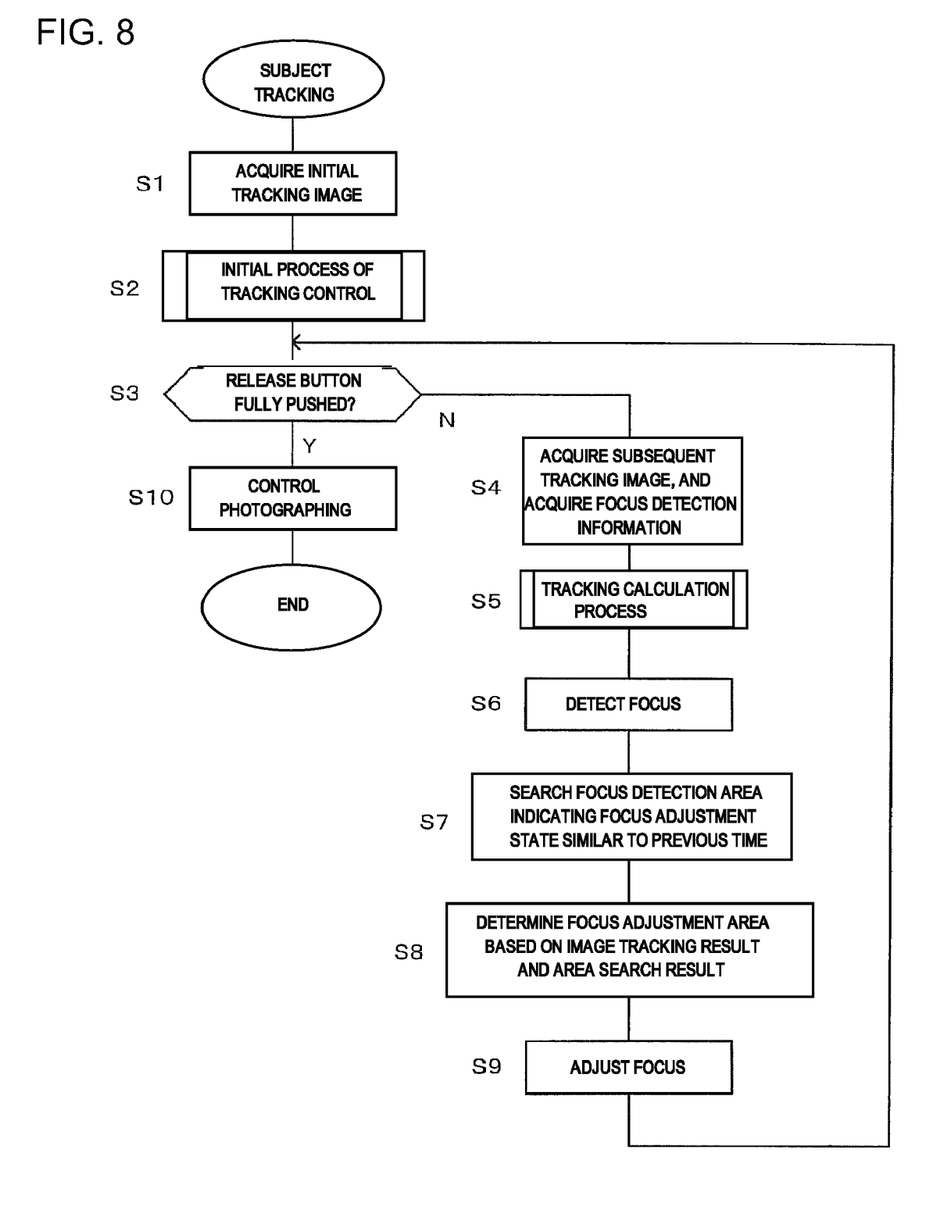
FIG. 8 is a flowchart showing a subject tracking operation according to one embodiment of the present invention.
Figure 9:
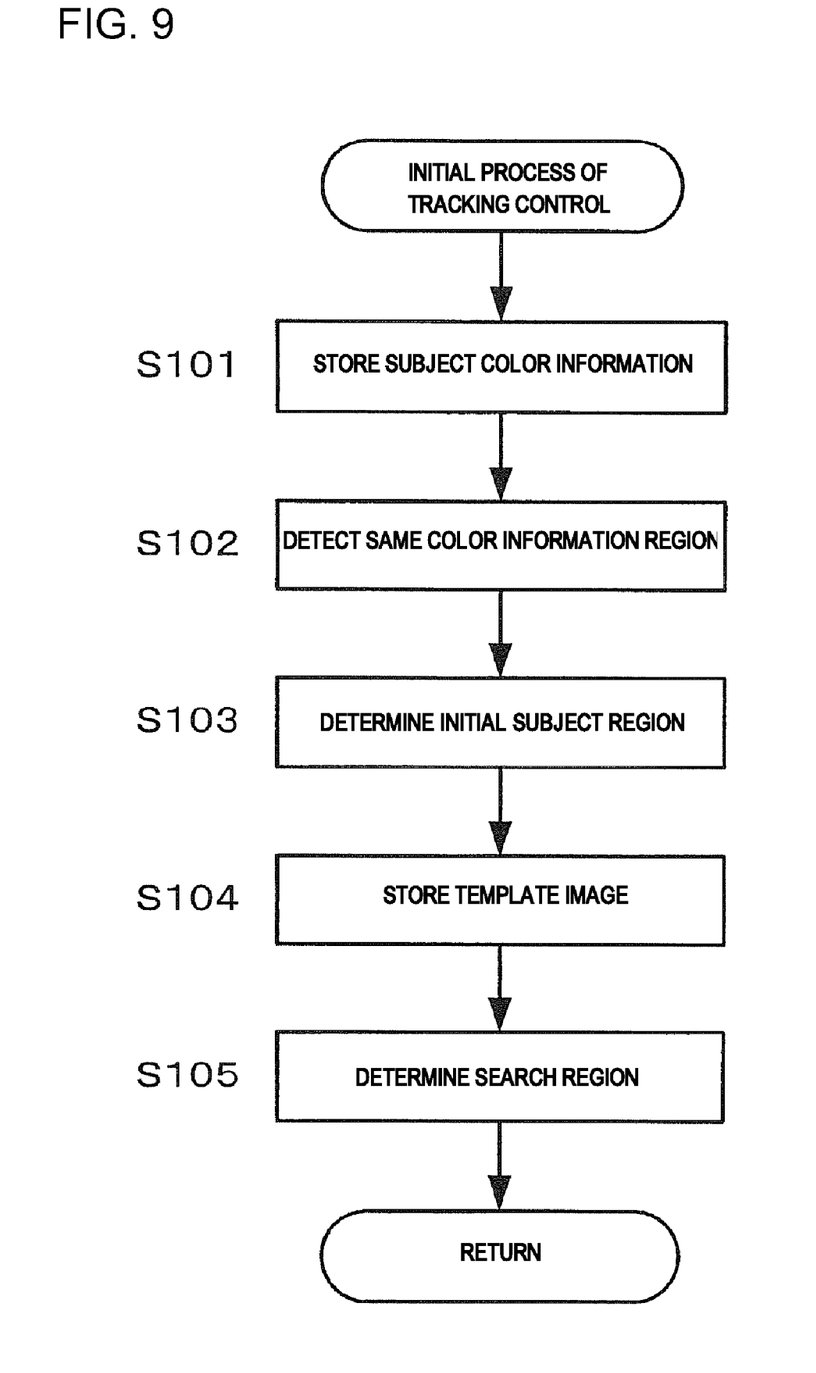
FIG. 9 is a flowchart showing an initial process of tracking control according to one embodiment of the present invention.
Figure 10:
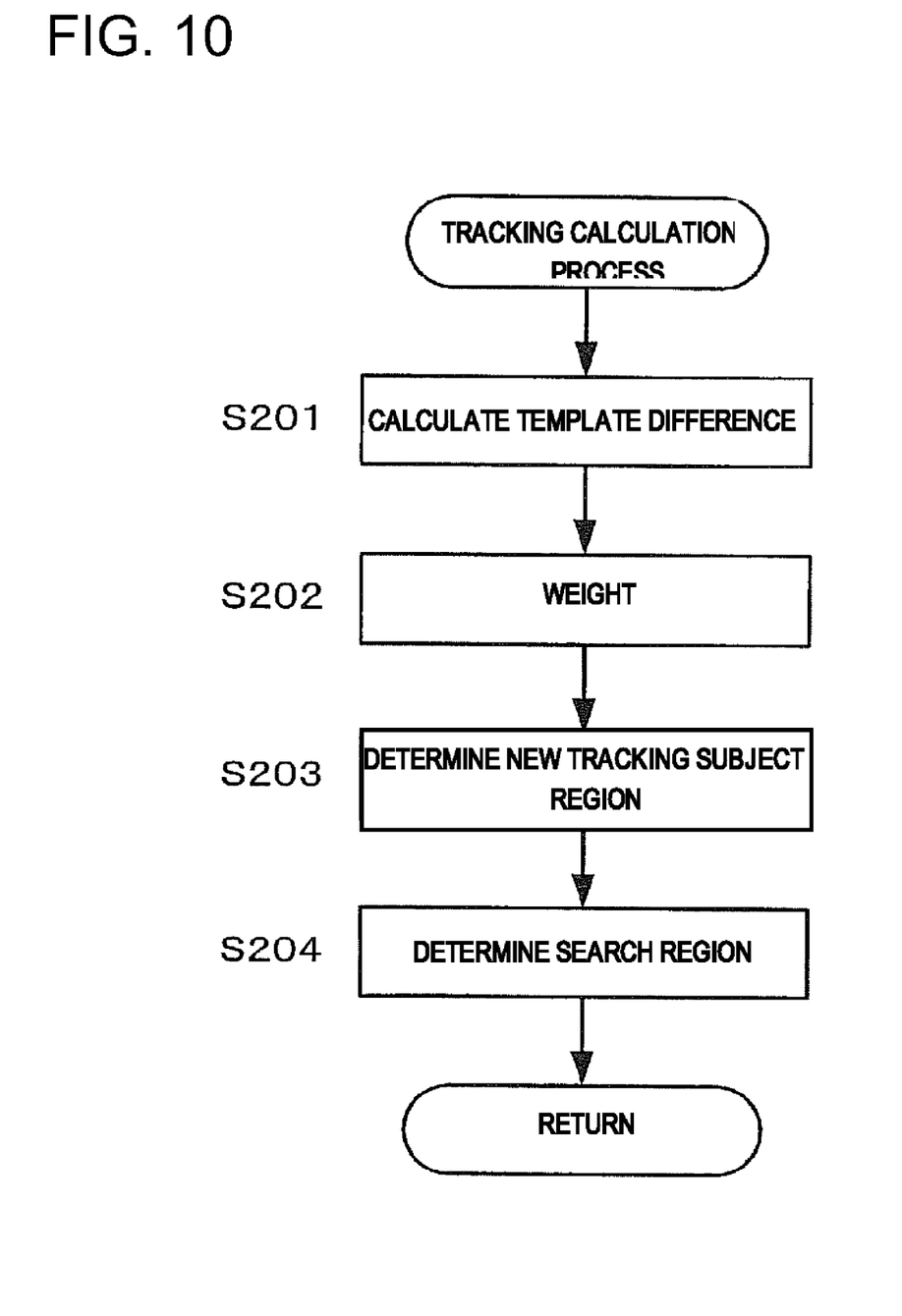
FIG. 10 is a flowchart showing a tracking calculation process according to one embodiment of the present invention.

The subject tracking operation according to one embodiment will now be described. FIG. 5 to FIG. 7 are views describing the subject tracking method according to one embodiment, and FIG. 8 to FIG. 10 are flowcharts showing the subject tracking process according to one embodiment. Other than when the shutter button is fully pushed to carry out photographing, the quick return mirror 5 is set within the photographing optical path shown with a broken line in FIG. 1, and the subject light entered from the photographing lens 8 is imaged on the focusing plate 11. The subject image on the focusing plate 11 is guided to the second imaging element 16 through the pentagonal roof prism 13, the prism 17, and the imaging lens 18, and the subject image signal is repeatedly output from the second imaging element 16.

A plurality of focus detection areas is set in the photographing lens 8, where an area mark is superimposed on the subject image on the focusing plate 11 by the liquid crystal display element 12, and the position of each focus detection area is displayed. In one embodiment, an example where the focus detection areas 45*a* to 45*g* are set at seven locations within the photographing screen is shown, as shown in FIG. 5. The mark of the relevant area is lighting displayed when an arbitrary area is selected by the focus detection area selection switch of the operation member 20.

As shown in FIG. 5, when the focus detection area 45*b* is selected by the focus detection area selection switch of the operation member 20, and the shutter button of the operation member 20 is half-pushed in this state, the focus detection area 45*b* is stored in the memory 19*d* as an initial AF area. The subject to be tracked is thereby specified. An example in which the photographer selects the initial AF area and manually specifies the subject to be tracked has been shown, but the initial AF area and the subject to be tracked may be set based on subject recognition result in a camera having a function of automatically recognizing the subject.

In step 1, an initial tracking image (firstly acquired image after the image tracking process is started) is acquired by the second imaging element 16. The initial tracking image is represented in RGB value for every pixel.

$$R[x,y], G[x,y], B[x,y] \quad (1)$$

The color information RG, BG of each pixel are calculated based on the RGB value of every pixel, and the luminance information L is calculated from the exposure time T, the gain Gain, and the color combining coefficients Kr, Kg, and Kb for a case where the image is acquired.

$$RG[x,y]=\text{Log}_2(R[x,y])-\text{Log}_2(G[x,y]),$$

$$BG[x,y]=\text{Log}_2(B[x,y])-\text{Log}_2(G[x,y]),$$

$$L[x,y]=\text{Log}_2(Kr \times R[x,y]+Kg \times G[x,y]+Kb \times B[x,y])-\text{Log}_2(T)-\text{Log}_2(\text{Gain}) \quad (2)$$

In the following step 2, the initial process of tracking control shown in FIG. 9 is executed. In step 1 of FIG. 9, the image of the position corresponding to the position of the focus detection area 45*b* in the initial tracking image acquired in the second imaging element 16 is stored as subject color information. In step 102, as shown in FIG. 6(*a*), same color information region indicating the color information similar to the subject color information is detected at the periphery of the position of the focus detection area 45*b* (see FIG. 5) in the initial tracking image, and in the subsequent step 103, the same color information region is determined as the initial tracking subject region 47.

An example of determining the tracking subject region 47 based on the subject color information is shown, where the size of the tracking subject region may be unified such as 3×3 to simplify the process, or the size of the subject region may be determined according to the distance information of the photographing lens 8.

In step 104, the image of the tracking subject region 47 in the initial tracking image is stored in the memory 19*d* as a template image 48 (see FIG. 6(*b*)) used in the image tracking process. For instance, when the starting point position of the tracking subject region 47 is (x, y)=(4, 5) as shown in FIG. 6(*a*), the color information of the template image 48 is expressed as below.

$$RG\text{ref}[rx,ry]=RG[x,y],$$

$$BG\text{ref}[rx,ry]=BG[x,y],$$

$$L\text{ref}[rx,ry]=L[x,y](rx,ry=1 \text{ to } 3, x=4 \text{ to } 6, y=5 \text{ to } 7) \quad (3)$$

Next, a region enlarged by a predetermined pixel (two pixels herein) towards the front, the back, the left, and the right with the tracking subject region 47 as the center is set as a search region 49 in step 105. In the example shown in FIG. 6(*a*), the search region 49 is a region of x=2 to 8, y=3 to 9.

After the initial process of tracking control is terminated, the process proceeds to step 3 of FIG. 8, and whether or not the shutter button of the operation member 20 is completely pushed, that is, whether or not the shutter release operation is performed is checked. When the shutter release operation is not made, the process proceeds to step 4, and the subsequent tracking image is acquired from the second imaging element 16 and the color information RG[x, y], BG[x, y] and the luminance information L[x, y] are calculated and stored in the memory 19*d*, similar to the process of step 1. Simultaneously, the focus detection signal corresponding to the pair of optical images for focus detection is acquired for every one of focus detection areas 45*a* to 45*g* by the distance measuring element 10.

In step 5, the tracking calculation process shown in FIG. 10 is executed. In step 201 of FIG. 10, the region of the same size as the template image 48 is sequentially cut out from the search region 49 in the subsequent tracking image, and the difference Diff in color information is calculated for every corresponding pixel of the cutout image and the template image 48. As shown with a thick broken line in FIG. 7(*a*), the difference Diff in color information with the template image 48 is calculated while shifting the region by one pixel in the search region 49.

When the starting point position of the search region 49 is (scx, scy)=(2, 3) as shown in FIG. 7(*a*), the calculation of the difference Diff is carried out in the following manner.

$$\text{Diff}[dx,dy] = \Sigma\Sigma\{ABS(RG[scx+dx-1+rx,scy+dy-1+ry]-RG\text{ref}[rx,ry])+ABS(BG[scx+dx-1+rx,scy+dy-1+ry]-BG\text{ref}[rx,ry])+ABS(L[scx+dx-1+rx,scy+dy-1+ry]-L\text{ref}[rx,ry])\} \quad (4)$$

In equation (4), dx, dy=1 to 5, rx, ry=1 to 3, scx=2, scy=3, and ΣΣ is the summation calculation of rx=1 to 3 and ry=1 to 3.

The difference Diff calculated in step 202 is then weighted. In the embodiment, a weighting table Wt[dc, dy] for the number (twenty-five in the example) of differences Diff[dx, dy](dx, dy=1 to 5) is set in advance, and a value obtained by multiplying a weighting coefficient Kw to the weighting table Wt is set as the weight.

Wt[dx, dy]={(2, 2, 2, 2, 2)
(2, 1, 1, 1, 2)
(2, 1, 0, 1, 2)
(2, 1, 1, 1, 2)
(2, 2, 2, 2, 2)}, $$\text{Diff}[dx,dy] = (Kw \times Wt[dx,dy]) + \text{Diff}[dx,dy](dx,dy=1 \text{ to } 5) \quad (5)$$

The weighting table Wt shown in equation (5) is a weighting pattern in which the weight on the difference Diff of the region cut out from the center of the search region 49 is the minimum and the weight on the difference Diff of the cutout region is larger towards the periphery of the search region 49, where the position of the focus detection area used to perform focus adjustment of the photographing lens 8 in the previous focus adjustment is prioritized by using such weighting table Wt. Normally, in the repeatedly performed automatic focus adjustment, the possibility of capturing the tracking target is assumed to be high in the focus detection area or the vicinity thereof used as the area for performing the focus adjustment of the photographing lens 8 in the previous focus adjustment, and thus the minimum weight is given to the difference Diff on the region cut out from the area position used in the previous focus adjustment.

When the AF mode of performing photographing while capturing the subject in the selected focus detection area such as a single AF mode in which the focus detection is performed in the focus detection area selected by the user through the focus detection area selection switch of the operation member 20 and the focus adjustment of the photographing lens 8 is performed based on the focus detection result, and a dynamic AF mode in which the focus detection is performed backed up by the focus detection result of other focus detection areas even when the subject is outside the selected focus detection area while performing the focus detection and the focus adjustment in the focus detection area selected by the user through the focus detection area selection switch of the operation member 20 to continuously track the moving subject is set, the minimum weight is given to the difference Diff on the region cut out from the position of the selected focus detection area. The tracking target thus can be reliably captured.

As a result of setting the weighting table Wt as shown in equation (5), even when the tracking target does not have color information with clear difference with respect to other portions such as background, a different portion such as the background different from the target is prevented from being falsely recognized and tracked as the target, the position of the image tracking result is prevented from moving to various positions such as the background and other different portions when the position relationship between the camera and the tracking target is not changed, and the tracking operation is stabilized.

The weighting coefficient Kw in equation (5) is the coefficient for adjusting the effect by the weighting table Wt. The value of the weighting coefficient Kw is set larger the smaller the difference between the color information of the tracking target and the color information of other portions such as the background to increase the effect by the weighting table Wt, so that the tracking target is properly captured and the tracking operation is stabilized. When the difference between the color information of the tracking target and the color information of other portions such as the background is relatively large, the value of the weighting coefficient Kw is set small to suppress unnecessary effect by the weighting table Wt.

In step 203, the minimum difference of the difference Diff[dx, dy] applied with weight is searched, and the cutout region in a case where the minimum difference is calculated in the search region 49 is determined as the new tracking subject region 47. Here, as shown in FIG. 7(*b*), the cutout region having the starting position (x, y)=(5, 6) is determined as the new tracking subject region 47.

A process of updating the image information of the template image 48 using the image information newly determined for the subject region 47 may be applied. In this case, the recent image information is gradually updated on the image information of the template image by adding 20% of the image information of the new subject region 47 with respect to 80% of the image information of the original template image 48, for example, so that change in the tracking subject can be easily followed. In this case, update is not performed every time the tracking calculation is performed, and update may be performed only when smaller than a certain threshold value based on the magnitude of the difference Diff of the position determined as the tracking subject region 47.

In step 204, a region enlarged by a predetermined pixel (two pixels herein) towards the front, the back, the left, and the right with the new tracking subject region 47 as the center is set as the search region 49. As shown in FIG. 7(*b*), the region of x=3 to 9, y=4 to 10 is the search region 49. Thereafter, the process returns to step 6 of FIG. 8.

In step 6 of FIG. 8 after returning, the focus adjustment state, that is, the defocus amount of the photographing lens 8 of each of selected focus detection areas 45*a* to 45*g* is detected based on the focus detection signal acquired in step 4. In the following step 7, the focus detection area indicating the defocus amount similar to the defocus amount of the focus detection area used in the previous focus adjustment is searched from the defocus amounts of all the focus detection areas.

In step 8, the area for performing focus adjustment is determined based on the new tracking subject region 47 the image tracking result in step 5 and the focus detection area of the area search result in steps 6 and 7. In the embodiment, the focus detection area corresponding to the new tracking subject region 47 of the image tracking result and the focus detection area of the area search result are compared, and a focus detection area common to the image tracking result and the area search result is determined as the area for performing focus adjustment (hereinafter, referred to as focus adjustment area). In step 9, the defocus amount detected in the focus adjustment area is converted to the lens driving amount, and the focusing lens 8b is driven by the lens drive control device 22 to perform focus adjustment.

The full-pushing of the release button may be checked in step 3 after the focus adjustment. The processes of steps 4 to 9 are repeatedly executed while the shutter button is half-pushed, and the process proceeds to step 10 to execute the photographing process when the shutter button is fully pushed.

Thus, according to the embodiment, the second imaging element 16 for imaging the image imaged by the photographing lens 8 and outputting the color information, and the memory 19d for storing the reference color information (color information of template image) related to the image of the tracking target are arranged, where the difference Diff between the color information of the image and the reference color information is calculated while shifting the comparison position of the image and the image of the target, and weighting is performed on each difference Diff to determine the position at where the weighted difference Diff is a minimum as the new position of the tracking target. Thus, even when the tracking target does not have color information of clear difference with respect to other portions such as background, a different portion such as the background different from the target is prevented from being falsely recognized and tracked as the target, the position of the image tracking result is prevented from moving to various positions such as the background and other different portions when the position relationship between the camera and the tracking target is not changed, the tracking target is correctly captured, and the tracking operation can be stabilized.

According to one embodiment, the weight of the difference Diff corresponding to the position determined as the position of the tracking target in the previous image tracking is set the minimum and the weight on the difference Diff is set larger the farther away from the position determined as the position of the tracking target in the previous image tracking, and thus the possibility of capturing the tracking target is high.

In the embodiment described above, an example of a weighting pattern that prioritizes the position of the focus detection area used to perform the focus adjustment in the previous focus adjustment has been shown, but the weighting pattern of the weighting table Wt is not limited to the pattern according to the embodiment described above.

Furthermore, in the embodiment described above, an example of weighting the difference Diff of the color information calculated within the search region has been described, but the difference Diff in color information with respect to the image of the entire range of the photographing screen may be obtained, and the weighting may be performed on the difference Diff calculated in the entire range of the photographing screen to set the new tracking subject region. In searching for the tracking subject region from the entire range of the photographing screen, the weight of the difference Diff corresponding to the center of the photographing screen of the photographing lens 8 is set the minimum, and the weight on the difference Diff is set larger the farther away from the center of the photographing screen of the photographing lens 8. Normally, the possibility of capturing the main subject at the center of the photographing screen is high, and thus the possibility of capturing the tracking target in the repeatedly performed image tracking is high.

Furthermore, the maximum value and the minimum value of the difference Diff in the color information may be extracted, and the weighting coefficient Kw may be set according to the difference between the maximum value and the minimum value so that the effect of the weighting table Wt is optimized. When the difference between the maximum value and the minimum value is small and the image in the search region or the photographing screen has a color close to uniformity and does not include a stand-out color, the value of the weighting coefficient Kw is set large to increase the effect by the weighting table Wt, thereby preventing false recognition as the background etc. and stabilizing the tracking operation. When the difference between the maximum value and the minimum value is relatively large and the difference between the color information of the tracking target and the color information of other portions such as the background is relatively large, the value of the weighting coefficient Kw is set small and unnecessary effect by the weighting table Wt is suppressed.

Furthermore, the weighting coefficient Kw may be set according to the photographing mode so that the effect of the weighting table Wt is optimized. For instance, in the photographing mode of tracking the subject that is moving fast such as in the sport mode or the pet mode, the value of the weighting coefficient Kw is set small to suppress unnecessary effect by the weighting table Wt so that the movement of the subject can be easily followed. When photographing the subject that does not move much such as in the portrait mode, the possibility of the subject suddenly moving far is low, and thus the weighting coefficient Kw is set large to increase the effect of he weighting table Wt so that switch from the tracking target to other portions such as the background is less likely to occur.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image recognition device comprising:
an image information acquiring unit configured to acquire first image information and second image information as a first image and a second image, respectively, the first image including a reference image to be recognized on the second image;
a holding unit configured to hold reference information of the reference image on the first image, the reference image information including a first reference position on the first image;
a detection unit configured to detect a difference between the reference image and a plurality of image areas on the second image respectively using the reference image information and the second image information;
a calculation unit configured to calculate a determination value at the plurality of image areas on the second image by weighting the difference detected by the detection unit,
wherein the weighting of the difference includes multiplying a weight by a weighting coefficient,
the weight being assigned to each of the plurality of image areas on the second image and determined based on a relationship between a position of an image area based on which the difference is detected and a second reference position on the second image that corresponds to the first reference position on the first image, and the weight coefficient being adjusted based on the difference detected by the detection unit; and a recognition unit configured to recognize an image area from among the plurality of image areas on the second image based on the determination value as an image area on the second image that corresponds to the reference image on the first image.

2. The image recognition device according to claim 1, wherein the calculation unit is configured to assign the weight to each of the plurality of image areas on the second image so that the determination value becomes relatively smaller as an image area based on which the difference is detected is closer to the second reference position on the second image, and wherein the recognition unit is configured to recognize an image area having a smallest determination value as an image area on the second image that corresponds to the reference image on the first image.

3. The image recognition device according to claim 1, wherein the calculation unit is configured to assign the weight to each of the plurality of image areas on the second image depending on a distance between the second reference position on the second image and a position of an image area based on which the difference is detected.

4. The image recognition device according to claim 3, wherein the calculation unit is configured to assign the weight to each of the plurality of image areas on the second image so that the determination value increases as the distance increases, and wherein the recognition unit is configured to recognize an image area having a smallest determination value as an image area on the second image that corresponds to the reference image on the first image.

5. The image recognition device according to claim 1, wherein the first reference position on the first image is a center of the first image, and wherein the calculation unit is configured to assign the weight to each of the plurality of image areas on the second image depending on a distance between a center of the second image and a position of an image area based on which the difference is detected.

6. The image recognition device according to claim 5, wherein the calculation unit is configured to assign the weight to each of the plurality of image areas on the second image so that the determination value decreases as an image area based on which the difference is detected approaches the center of the second image, and wherein the recognition unit is configured to recognize an image area having a smallest determination value as an image area on the second image that corresponds to the reference image on the first image.

7. The image recognition device according to claim 1, wherein the plurality of image areas on the second image are arranged within a predetermined range from the second reference position on the second image.

8. The image recognition device according to claim 1, wherein the detection unit is configured to detect the difference using at least one of color information and luminance information of the reference image on the first image and the plurality of image areas on the second image.

9. The image recognition device according to claim 1, further comprising:

an updating unit configured to combine the reference image information with image information of the image area recognized on the second image, and to update the reference image information of the reference image held on the holding unit with the combined reference image information.

10. A focus adjustment device comprising:

an image information acquiring unit configured to acquire first image information and second image information as a first image and a second image, respectively, through an optical system, the first image including a reference image to be recognized on the second image;

a holding unit configured to hold reference information of the reference image on the first image, the reference information including a first reference position on the first image;

a detection unit configured to detect a difference between the reference image and a plurality of image areas on the second image respectively using the reference image information and the second image information;

a calculation unit configured to calculate a determination value at the plurality of image areas on the second image by weighting the difference detected by the detection unit, wherein the weighting of the difference includes multiplying a weight by a weighting coefficient, the weight being assigned to each of the plurality of image areas on the second image and determined based on a relationship between a position of an image area based on which the difference is detected and a second reference position on the second image that corresponds to the first reference position on the first image, and the weight coefficient being adjusted based on the difference detected by the detection unit;

a recognition unit configured to recognize an image area from among the plurality of image areas on the second image based on the determination value as an image area on the second image that corresponds to the reference image on the first image;

a focus detection unit configured to detect a focus state of the optical system at a plurality of detection areas on the second image by the optical system;

a focus area selection unit configured to select at least one focus detection area from among the plurality of detection areas on the second image based on a position of the image area on the second image recognized by the recognition unit and the focus state detected by the focus detection unit; and a focus adjustment unit configured to perform focus adjustment of the optical system at the focus detection area selected by the selection unit.

11. The focus adjustment device according to claim 10, further comprising:

a specifying unit configured to specify at least one focus detection area from among the plurality of detection areas on the first image when the first image is captured, wherein the first reference position on the first image is a position of the at least one focus detection area on the first image, and wherein the calculation unit is configured to assign the weight to each of the plurality of image areas on the second image depending on a distance between the second reference position on the second image and a position of an image area based on which the difference is detected.

12. The focus adjustment device according to claim 11, wherein the calculation unit is configured to assign the weight to each of the plurality of image areas on the second image so that the determination value decreases as the distance decreases, and
wherein the recognition unit is configured to recognize an image area having a smallest determination value as an image area on the second image that corresponds to the reference image on the first image.

13. The focus adjustment device according to claim 10, further comprising:
an updating unit configured to combine the reference image information with image information of the image area recognized on the second image, and to update the reference image information of the reference image held on the holding unit with the combined reference image information.

14. The focus adjustment device according to claim 10, wherein the detection unit is configured to detect the difference using at least one of color information and luminance information of the reference image on the first image and the plurality of image areas on the second image.

15. An imaging apparatus comprising:
an image information acquiring unit configured to acquire first image information and second image information as a first image and a second image, respectively, through an optical system, the first image including a reference image to be recognized on the second image;
a holding unit configured to hold reference information of the reference image on the first image, the reference information including a first reference position of the reference image on the first image;
a detection unit configured to detect a difference between the reference image and a plurality of image areas on the second image respectively using the reference image information and the second image information;
a calculation unit configured to calculate a determination value at the plurality of image areas on the second image by weighting the difference detected by the detection unit,
wherein the weighting of the difference includes multiplying a weight by a weighting coefficient,
the weight being assigned to each of the plurality of image areas on the second image and determined based on a relationship between a position of an image area based on which the difference is detected and a second reference position on the second image that corresponds to the first reference position on the first image, and
the weight coefficient being adjusted based on the difference detected by the detection unit;
a recognition unit configured to recognize an image area from among the plurality of image areas on the second image based on the determination value as an image area on the second image that corresponds to the reference image on the first image;
a focus detection unit configured to detect a focus state of the optical system at a plurality of detection areas provided on the second image by the optical system;
a focus area selection unit configured to select at least one focus detection area from among the plurality of detection areas on the second image based on a position of the image area on the second image recognized by the recognition unit and the focus state detected by the focus detection unit; and
a focus adjustment unit configured to perform focus adjustment of the optical system at the focus detection area selected by the selection unit.

16. The imaging apparatus according to claim 15, further comprising:
an updating unit configured to combine the reference image information with image information of the image area recognized on the second image, and to update the reference image information of the reference image held on the holding unit with the combined reference image information.

17. The imaging apparatus according to claim 15, wherein the detection unit is configured to detect the difference using at least one of color information and luminance information of the reference image on the first image and the plurality of image areas on the second image.

18. An image recognition method comprising:
acquiring first image information and second image information as a first image and a second image, respectively, the first image including a reference image to be recognized on the second image;
holding reference information of the reference image on the first image, the reference information including a first reference position on the first image;
detecting a difference between the reference image and a plurality of image areas on the second image respectively using reference information and the second image information;
calculating a determination value at the plurality of image areas on the second image by weighting the difference,
wherein the weighting of the difference includes multiplying a weight by a weighting coefficient,
the weight being assigned to each of the plurality of image areas on the second image and determined based on a relationship between a position of an image area based on which the second difference is detected and a second reference position on the second image that corresponds to the first reference position on the first image, and
the weight coefficient being adjusted based on the difference detected; and
recognizing an image area from among the plurality of image areas on the second image based on the determination value as an image area on the second image that corresponds to the reference image on the first image.

19. The image recognition method according to claim 18, wherein, in the step of calculating the determination value, the weight is assigned to each of the plurality of image areas on the second image so that the determination value becomes relatively smaller as an image area based on which the difference is detected is closer to the second reference position on the second image, and
wherein, in the step of recognizing the image area from among the plurality of image areas on the second image, an image area having a smallest determination value is recognized an image area on the second image that corresponds to the reference image on the first image.

20. The image recognition method according to claim 18, wherein, in the step of calculating the determination value, the weight is assigned to each of the plurality of image areas on the second image depending on a distance between the second reference position on the second image and a position of an image area based on which the difference is detected.

21. The image recognition method according to claim 20, wherein, in the step of calculating the determination value, the weight is assigned to each of the plurality of image areas on the second image so that the determination value is increases as the distance increases, and wherein, in the step of recognizing the image area from among the plurality of image areas on the second image, an image area having a smallest determination value is recognized as an image area on the second image that corresponds to the reference image on the first image.

22. The image recognition method according to claim 18, wherein the first reference position on the first image is a center of the first image, and wherein, in the step of calculating the determination value, the weight is assigned to each of the plurality of image areas on the second image depending on a distance between a center of the second image and a position of an image area based on which the difference is detected.

23. The image recognition method according to claim 22, wherein, in the step of calculating the determination value, the weight is assigned to each of the plurality of image areas on the second image so that the determination value decreases as an image area based on which the difference is detected approaches the center of the second image, and wherein, in the step of recognizing the image area from among the plurality of image areas on the second image, an image area having a smallest determination value is recognized as an image area on the second image that corresponds to the reference image on the first image.

24. The image recognition method according to claim 18, wherein the plurality of image areas on the second image are arranged within a predetermined range from the second reference position on the second image.

25. The image recognition method according to claim 18, further comprising:
combining the reference image information with image information of the image area recognized on the second image; and
updating the reference image information of the reference image with the combined reference image information.

26. The image recognition method according to claim 18, wherein, in the step of detecting the difference, the difference are detected using at least one of color information and luminance information of the reference image on the first image and the plurality of image areas on the second image.

27. A focus adjustment method comprising:
acquiring first image information and second image information as a first image and a second image, respectively, through an optical system, the first image including a reference image to be recognized on the second image;
holding reference information of the reference image on the first image, the reference information including a first reference position on the first image;
detecting a difference between the reference image and a plurality of image areas on the second image respectively using the reference image information and the second image information;
calculating a determination value at the plurality of image areas on the second image by weighting the difference, wherein the weighting of the difference includes multiplying a weight by a weighting coefficient, the weight being assigned to each of the plurality of image areas on the second image and determined based on a relationship between a position of an image area based on which the difference is detected and a second reference position on the second image that corresponds to the first reference position on the first image, and the weight coefficient being adjusted based on the difference detected by the detection unit;
recognizing an image area from among the plurality of image areas on the second image based on the determination value as an image area on the second image that corresponds to the reference image on the first image;
detecting a focus state of the optical system at a plurality of detection areas on the second image by the optical system;
selecting at least one focus detection area from among the plurality of detection areas on the second image based on the image area recognized on the second image and the focus state; and
performing focus adjustment of the optical system at the focus detection area selected by the selection unit.

28. The focus adjustment method according to claim 27, further comprising:
specifying at least one focus detection area from among the plurality of detection areas on the first image when the first image is captured,
wherein the first reference position on the first image is a position of the at least one focus detection area specified on the first image; and
wherein, in the step of calculating the determination value, the weight is assigned to each of the plurality of image areas on the second image depending on a distance between the second reference position on the second image and a position of an image area based on which the difference is detected.

29. The focus adjustment method according to claim 28, wherein, in the step of calculating the determination value, the weight is assigned to each of the plurality of image areas on the second image so that the determination value decreases as the distance decreases.

30. The focus adjustment method according to claim 27, further comprising:
combining the reference image information with image information of the image area recognized on the second image; and
updating the reference image information of the reference image with the combined reference image information.

31. The focus adjustment method according to claim 27, wherein, in the step of detecting the difference, the difference are detected using at least one of color information and luminance information of the reference image on the first image and the plurality of image areas on the second image.

32. An image recognition device comprising:
imaging means for acquiring first image information and second image information as a first image and a second image, respectively, the first image including a reference image to be recognized on the second image;
holding means for holding reference information of the reference image on the first image, the reference image information including a first reference position on the first image;
detection means for detecting a difference between the reference image and a plurality of image areas on the second image respectively using the reference image information and the second image information;

calculation means for calculating a determination value at the plurality of image areas on the second image by weighting the difference detected by the detection unit, wherein the weighting of the difference includes multiplying a weight by a weighting coefficient, the weight being assigned to each of the plurality of image areas on the second image and determined based on a relationship between a position of an image area based on which the difference is detected and a second reference position on the second image that corresponds to the first reference position on the first image, and the weight coefficient being adjusted based on the difference detected by the detection unit; and a recognition means for recognizing an image area from among the plurality of image areas on the second image based on the determination value as an image area on the second image that corresponds to the reference image on the first image.

33. The image recognition device according to claim 32, further comprising:

an updating means for combining the reference image information with image information of the image area recognized on the second image, and updating the reference image information of the reference image held on the holding means with the combined reference image information.

34. The image recognition device according to claim 32, wherein the detection means detects the difference using at least one of color information and luminance information of the reference image on the first image and the plurality of image areas on the second image.

* * * * *